May 19, 1925.
P. A. TREPIER
1,538,760
SHOCK ABSORBING DEVICE FOR AUTOMOBILE VEHICLES
Filed Aug. 14, 1923    2 Sheets-Sheet 1
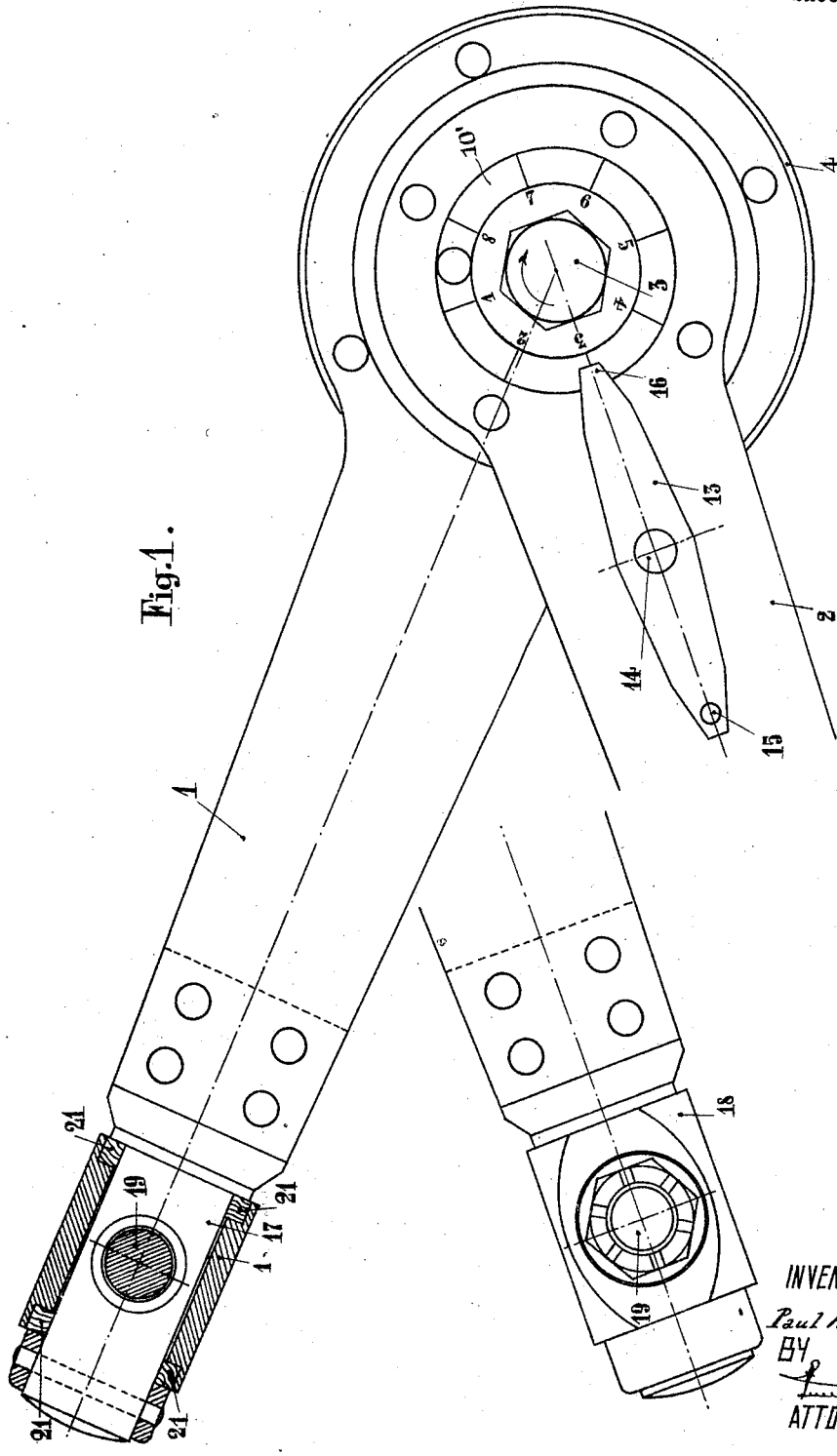
INVENTOR
Paul Aimé Trepier
BY
ATTORNEY May 19, 1925.  1,538,760
P. A. TREPIER
SHOCK ABSORBING DEVICE FOR AUTOMOBILE VEHICLES
Filed Aug. 14, 1923   2 Sheets-Sheet 2
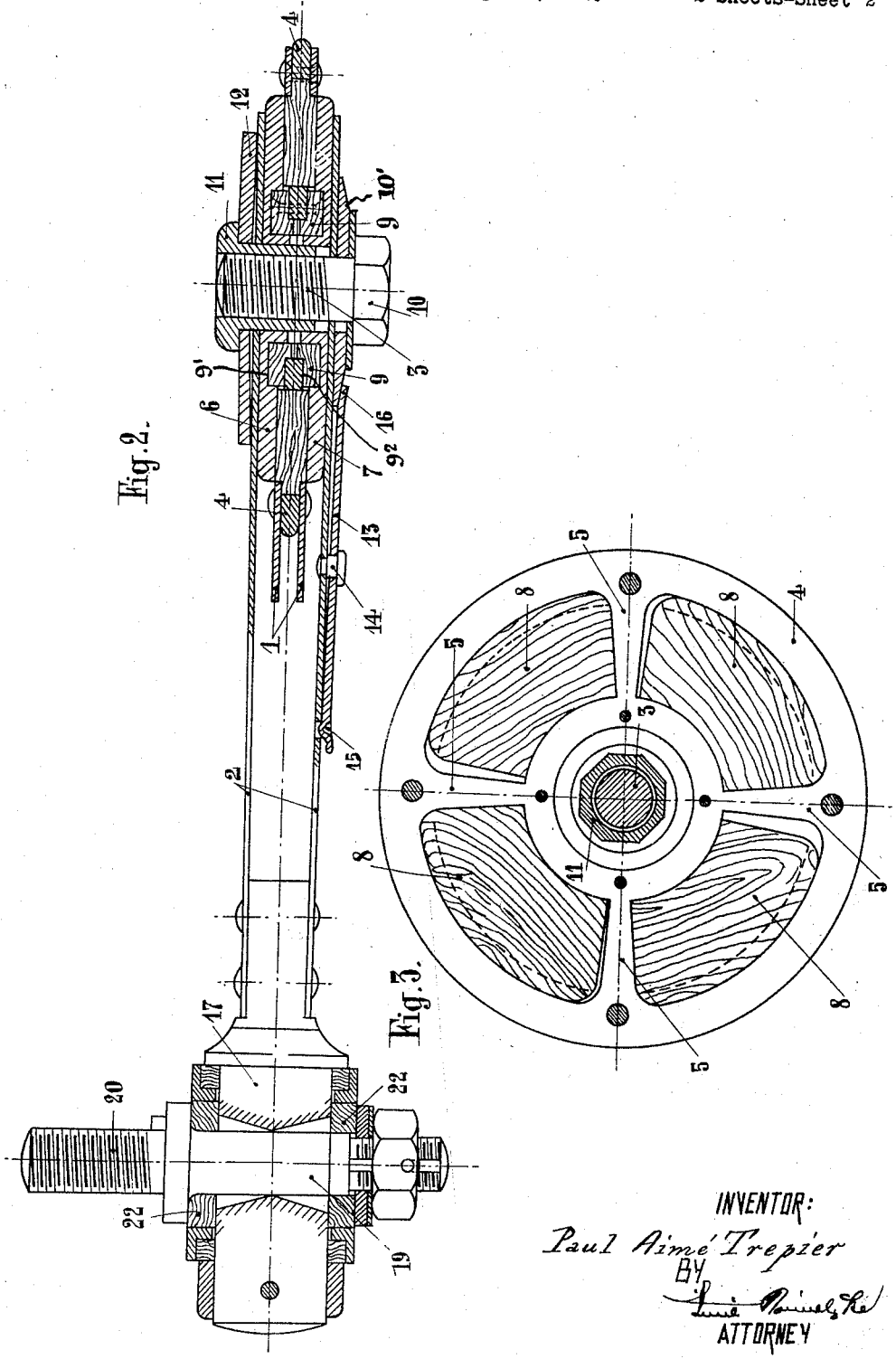
INVENTOR:
Paul Aimé Trepier
BY
ATTORNEY Patented May 19, 1925.

1,538,760

UNITED STATES PATENT OFFICE.

PAUL AIMÉ TREPIER, OF PARIS, FRANCE, ASSIGNOR TO HIMSELF AND SOCIETE P. NICOLLE & CIE., OF MONTREUIL S/BOIS, SEINE, FRANCE.

SHOCK-ABSORBING DEVICE FOR AUTOMOBILE VEHICLES.

Application filed August 14, 1923. Serial No. 657,397.

*To all whom it may concern:*

Be it known that I, PAUL AIMÉ TREPIER, citizen of the French Republic, residing at Paris, Seine, France, have invented certain new and useful Improvements in Shock-Absorbing Devices for Automobile Vehicles, of which the following is a specification.

The efficiency of suspension shock-absorbing devices of the continuous resistance type as applied to automobiles and other vehicles is now generally admitted. But the objection has been raised, and justly, that such devices stiffen the suspension where the surface irregularities are only slight. For instance, riding over a paved road is made uncomfortable.

The present invention seeks to provide an improved construction wherein this objection is overcome; one form which such construction may take in practice being illustrated by way of example in the accompanying drawings, in which:

Figure 1 is a side elevation of the invention;

Fig. 2 is horizontal sectional view; and

Fig. 3 is a partial vertical section view of the central part of the device.

As shown in said drawings, the improved shock-absorber consists of two angularly-disposed arms or members 1 and 2 mounted for swinging movement about an axis 3. The arm 1 comprises two steel blades riveted to the opposite sides of a disk 4 which is cut away in such a manner as to provide a set of four segmental pockets or openings separated from one another by radial ribs 5. The other arm 2 likewise comprises a pair of steel blades which are riveted to the outer faces of two plates 6 and 7.

A friction ring formed by four independent segments 8 is interposed between the plates 6 and 7; the segments 8 being positioned in the pockets in disk 4 and having a thickness greater than that of said disk, and a length which is less than the length of the said pockets, due to which latter fact the segments are capable of an endwise movement or play between the ribs 5, as will be understood from Fig. 3. The segments are made of some suitable material which is not only wear-resisting but which does not need to be lubricated; wood soaked in oil, for example, or fiber, compressed asbestus, etc.

A second friction ring 9, of the same material as the segments 8 forming the first ring, is rigidly fastened to the disk 4, and fits in mating annular seats or recesses 9' formed in the inner faces of plates 6 and 7, the periphery of this ring having a continuous groove $9^2$ which acts to center the disk with relation to said plates. A dial 10' (Figs. 1 and 2) is provided and is secured to the threaded stud or screw 3 directly against the inner face of the head 10 thereof, about which screw the arms 1 and 2 pivot; said screw extending into an internally-threaded sleeve nut 11 which coacts with a spring washer 12 and with the aforesaid screw 3 to hold the two arms 1 and 2 together and to cause the plates 6 and 7 to exert a constant, but regulatable pressure both upon the segments 8 and upon the ring 9.

The outer portion of the dial 10' is engaged by the adjacent end 16 of a leaf spring 13 which is centrally pivoted at 14 to one of the steel blades of the arm 2 and is provided at its other end with a lug 15 for reception in a socket in said blade; and in order to remove or apply the dial and the screw 3 the said lug must first be withdrawn from its socket and the spring turned into a position in which its end 16 is out of the zone occupied by the dial.

At its outer end, each of the arms 1 and 2 is formed with a terminal pivot or trunnion 17 on which a sleeve 18 is loosely fitted; and the said trunnion and sleeve are provided with alining transverse openings for the passage of a second trunnion or pivot 19 therethrough which is constructed with a collar and with a threaded extension 20, the latter being utilized in effecting the attachment of the device to the vehicle. To guide the pivots 17 and 19, friction rings 21 and 22 of the same material as the parts 8 and 9 are provided, and are fitted in recesses formed in the sleeve 18.

The device is fastened by means of the aforesaid extensions 20 to the chassis of the vehicle on the one hand, and to the axle on the other hand; the flexion variations of the suspension springs producing angular displacements of the two arms 1 and 2 relative to each other, the effects of which are:

1. To take up successively the play of each of the segments 8 between the boundary ribs 5 of the corresponding pockets;

2. To cause the segments 8 to slide across the plates 6 and 7, thus setting up a braking action which increases in intensity according as the spring washer 12 is the more compressed and flattened by the adjustment of the regulating screw 3.

The result of this arrangement is that the slight oscillations of the suspension springs serve only to take up the play between the segments 8 and their pockets, producing no braking action whatever; whereas the oscillations of great amplitude are braked as much as is necessary. With the play suitably calculated, the advantages of the continuous friction shock-absorber are retained without stiffening the suspension when the road presents only slight surface irregularities. The play between the segments and the corresponding ribs may be the same for all segments, or, as shown in Fig. 3, may vary for different segments. With different amounts of play, the various segments will come into operation successively, and the braking action will reach its maximum after having passed through three intermediate stages corresponding to the braking force of one, two or three segments; the utilization of segments having different amounts of play rendering the braking action virtually progressive.

It is to be clearly understood that the particular embodiment of the invention which has been described above, and which has been illustrated in the drawings, is given merely by way of example, and that changes in and modifications of such embodiment may be made without departing from the spirit of the invention. For instance, there may be a different number of segments 8 from that shown; and these segments may have play of the same or different extents. The greater the number of segments, the more progressive will be the braking action, if the different extents of play are properly calculated.

I claim as my invention:

1. A shock-absorber, comprising a pair of angularly-disposed arms mounted on a common pivot for relative swinging movement toward or from each other, each arm embodying a pair of spaced, parallel blades, the blades of one arm extending between those of the other arm; a pair of plates interposed between the adjacent blades of the first- and second-named arms and rigidly secured to the inner faces of the latter; a disk interposed between said plates and rigidly connected with the blades of the first-named arm; and a friction ring carried by said disk and constantly engaging the inner faces of the plates.

2. A shock-absorber according to claim 1, in which the inner faces of the plates are provided with mating annular recesses, and in which a friction ring is fitted in said recesses and has a peripheral centering groove to receive the inner portion of the disk.

3. A shock-absorber, comprising a pair of angularly-disposed arms mounted on a common pivot for relative swinging movement toward or from each other, each arm embodying a pair of spaced, parallel blades, the blades of one arm extending between those of the other arm; a pair of plates interposed between the adjacent blades of the first- and second-named arms and rigidly secured to the inner faces of the latter, the inner faces of said plates being provided with mating annular recesses; a friction ring seated in said recesses and having a peripheral centering groove; a disk encircling said ring and centered in its groove, said disk having arcuate block-receiving openings formed through it; and an arcuate friction block slidable endwise in each opening and having a thickness greater than that of the disk so as to constantly engage the inner faces of both plates.

In testimony whereof I affix my signature.

PAUL AIMÉ TREPIER.